Jan. 2, 1968 H. HOFFMAN 3,360,861

DENTAL BAND PUSHER AND ADAPTER INSTRUMENT

Filed Sept. 1, 1965

INVENTOR.
HERBERT HOFFMAN
BY
John M. Montstream
ATTORNEY

United States Patent Office 3,360,861

Patented Jan. 2, 1968

3,360,861
DENTAL BAND PUSHER AND ADAPTER INSTRUMENT

Herbert Hoffman, New York, N.Y. (14 Fairway Road, Lido Beach, New York 12123)

Filed Sept. 1, 1965, Ser. No. 484,328
1 Claim. (Cl. 32—66)

The invention is directed to a dental instrument for the application of a band on a tooth. The instrument comprises two members one which constitutes a pusher and the other is an adapter by means of which the band may be manipulated such as for modifying or improving the fit of the band on the tooth.

It is an object of the invention to provide an improved dental tooth band pusher and adapter instrument.

Other objects of the invention will be more apparent from the following description when taken in connection with the accompanying drawing illustrating a preferred embodiment thereof in which.

Figure 1:
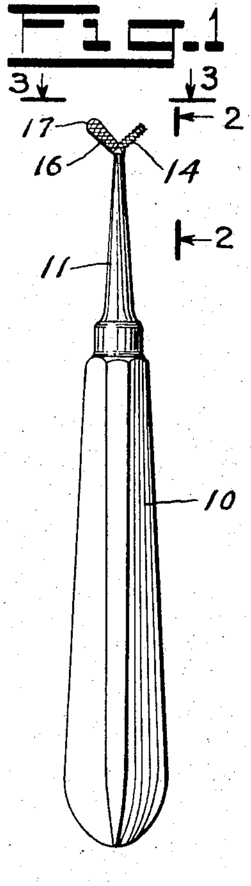
FIG. 1 is a front view of the dental instrument.
Figure 2:
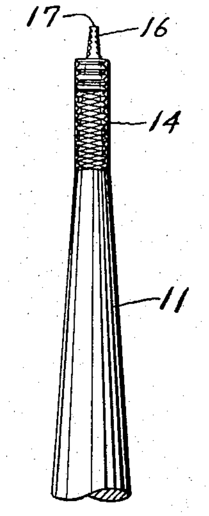
FIG. 2 is an enlarged side view of the instrument.
Figure 3:
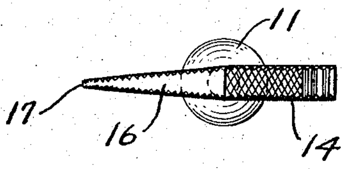
FIG. 3 is an enlarged top view.

The dentist in applying a band to a tooth selects one of the proper or approximate size and pushes it onto the tooth. In order to improve the fit or enable the band to be pushed farther down on the tooth, the band usually requires some deformation such as shape at the edges of the band.

The tool herein is suitable for this use and includes a handle 10 of any suitable shape and size and which carries a shank 11 of relatively slender form projecting from the end of the handle and tapering outwardly. On the end of the shank is provided a pusher member 14 which is square or approximately in cross section being about 1/16 of an inch on each side and having a length of about 1/4 of an inch. The pusher member projects from the end of the shank at an angle of about 135 degrees with respect to the shank so that it angles outwardly and upwardly from the end of the shank.

An adapter member 16 projects on the other side of the end of the shank in the same plane as the pusher member. It is about 1/16 of an inch square in cross section at the root of the member where it is attached to the end of the shank and the root of the pusher member and projects outwardly at an angle of about 135 degrees with respect to the axis of the shank so that it projects upwardly and outwardly. The roots of the pusher member and adapter member merge to give support and strength one to the other. The adapter member is about 1/4 of an inch in length and tapers outwardly to a narrow or slightly blunt edge at the outer end. Preferably, too, this member is a little wider at the outer end. It has a curved outer end 17 which desirably is an arc of a circle for easy insertion between the band and tooth. The increased width at the outer end is brought about by flattening of this end of the adapter member to provide its taper. The taper is in the plane of the members.

It is desirable to provide shallow indentations on one or more of the surfaces of the two members and such indentations are shown on all surfaces including the end face of the pusher member.

The outer end or face of the pusher member is used to push the band on the tooth by engaging the edge of the band with the end of the member. If the fit of the band is not as desired, the dentist will insert the adapter member between the tooth and the band and shape it or deform it as may be necessary in order to push it farther down on the tooth to the desired position or for any other purpose.

As a consequence of the instrument having both the adapter and the pusher members together, much time is saved by the dentist in fitting the band to a tooth with one instrument serving both purposes. The instrument is less expensive to manufacture as well. Should one of the members be broken off, the instrument is still useable.

This invention is presented to fill a need for improvements in dental pusher and adapter instrument. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A dental band pusher and adapter instrument comprising a handle, a shank projecting from one end thereof and having an end and a longitudinal axis, a pusher member carried by the shank end and projecting outwardly from its root at an angle with respect to the shank, the angle being in the region of 135 degrees with respect to the shank axis, the pusher member being square or substantially square throughout its length with the sides being about 1/16 of an inch in dimension, the pusher member having a length of about 1/4 of an inch, an adapter member carried by the shank end and projecting outwardly from its root at an angle with respect to the shank on the opposite side of the shank from the pusher member and in the same plane as the latter, the angle being in the region of the 135 degrees with respect to the shank axis, the roots of the two members merging into each other, the adapter member having a length of about 1/4 of an inch and tapering outwardly from its root to its outer end, and the outer end of the adapter member being rounded and having a narrow but slightly blunt edge.

References Cited

UNITED STATES PATENTS 1,261,339 4/1918 Angle.

OTHER REFERENCES

Orthodontic Appliances and Accessories Catalog "G," The S. S. White Dental Mfg. Co., July 1925 p. 46 (Copy Available Group 333).

LOUIS G. MANCENE, *Primary Examiner.*

ROBERT E. MORGAN, *Examiner.*